(12) United States Patent
Flanary et al.

(10) Patent No.: US 10,148,138 B2
(45) Date of Patent: Dec. 4, 2018

(54) MOWER MOTOR

(71) Applicant: Moog Inc., East Aurora, NY (US)

(72) Inventors: Ronald Flanary, Blacksburg, VA (US); Charles James Ford, III, Blacksburg, VA (US)

(73) Assignee: Moog Inc., Elma, NY (US)

( * ) Notice: Subject to any disclaimer, the term of this patent is extended or adjusted under 35 U.S.C. 154(b) by 347 days.

(21) Appl. No.: 14/769,257

(22) PCT Filed: Mar. 14, 2014

(86) PCT No.: PCT/US2014/028285
§ 371 (c)(1),
(2) Date: Aug. 20, 2015

(87) PCT Pub. No.: WO2014/144042
PCT Pub. Date: Sep. 18, 2014

(65) Prior Publication Data
US 2015/0380990 A1    Dec. 31, 2015

Related U.S. Application Data

(60) Provisional application No. 61/790,388, filed on Mar. 15, 2013.

(51) Int. Cl.
| | | |
|---|---|---|
| *H02K 21/16* | (2006.01) | |
| *H02K 1/12* | (2006.01) | |
| *H02K 1/14* | (2006.01) | |
| *H02K 5/04* | (2006.01) | |
| *H02K 11/215* | (2016.01) | |

(Continued)

(52) U.S. Cl.
CPC ............... *H02K 1/12* (2013.01); *H02K 1/146* (2013.01); *H02K 5/04* (2013.01); *H02K 11/215* (2016.01); *H02K 11/33* (2016.01); *H02K 21/16* (2013.01); *H02K 5/225* (2013.01)

(58) Field of Classification Search
CPC .......... H02K 29/08; H02K 1/14; H02K 1/146; H02K 5/04; H02K 21/16; H02P 1/00; H02P 1/04; H02P 6/14; H02P 6/18
See application file for complete search history.

(56) References Cited

U.S. PATENT DOCUMENTS 3,774,059 A    11/1973  Cox
3,875,437 A *  4/1975  Hara ...................... H02K 37/04
                                                310/49.45

(Continued)

*Primary Examiner* — Edgardo San Martin
(74) *Attorney, Agent, or Firm* — Hodgson Russ LLP

(57) ABSTRACT

A motor includes a rotor having a plurality of pole magnets angularly spaced about the rotor's rotational axis through an angle of 360°, and a stator including a plurality of windings angularly spaced about the rotational axis through an angle less than 360° to provide an angular section free of windings, wherein at least one of the plurality of pole magnets is not radially opposite any of the plurality of windings at any given rotational position of the rotor. The motor is designed for use in powering a horizontal blade reel of a cylindrical lawn mower, and includes a housing having a cross-sectional shape in the form of a chord-truncated circle, such that the housing has a flat portion corresponding to the angular section free of windings. The truncated motor housing avoids unattractive "layover" of grass during mowing.

5 Claims, 12 Drawing Sheets

(51) Int. Cl.
*H02K 11/33* (2016.01)
*H02K 21/14* (2006.01)
*H02K 5/22* (2006.01)

(56) References Cited

U.S. PATENT DOCUMENTS

| | | | | |
|---|---|---|---|---|
| 4,031,419 A * | 6/1977 | Spiesberger | ............ | H02K 21/16 310/156.42 |
| 4,315,171 A * | 2/1982 | Schaeffer | ............... | H02K 37/14 310/216.109 |
| 4,385,247 A * | 5/1983 | Satomi | ................... | H02K 37/18 310/49.33 |
| 4,642,494 A * | 2/1987 | Lundin | .................. | H02K 21/16 310/162 |
| 5,412,267 A * | 5/1995 | Okada | ...................... | H02K 1/17 29/596 |
| 6,700,250 B2 * | 3/2004 | Miyasaka | ............... | H02K 7/063 310/261.1 |
| 6,713,924 B1 * | 3/2004 | Fukushima | ............ | H02K 21/24 310/159 |
| 7,173,354 B2 * | 2/2007 | Kim | ....................... | H02K 7/063 310/156.32 |
| 7,285,889 B2 * | 10/2007 | Shkondin | ............... | H02K 25/00 310/127 |
| 7,679,239 B2 * | 3/2010 | Park, II | .................. | H02K 7/061 310/184 |
| 8,575,800 B1 * | 11/2013 | Fox | .......................... | H02K 1/06 279/141 |
| 8,643,319 B2 * | 2/2014 | Celik | ....................... | H02P 6/14 318/400.04 |
| 9,398,743 B1 * | 7/2016 | Fox | .......................... | H02K 1/06 |
| 2003/0175018 A1 | 9/2003 | Heydt et al. | | |
| 2004/0091127 A1 * | 5/2004 | Yasuda | .................... | B06B 1/16 381/162 |
| 2004/0104631 A1 | 6/2004 | Noguchi | | |
| 2005/0174000 A1 * | 8/2005 | Shimomura | ............. | H02K 5/04 310/89 |
| 2006/0001393 A1 | 1/2006 | Rozman | | |
| 2011/0120073 A1 | 5/2011 | Flanary | | |

* cited by examiner

MOWER MOTOR

CROSS-REFERENCE TO RELATED APPLICATIONS

This application is a national stage application of international patent application PCT/US14/28285, filed Mar. 14, 2014, which claims priority to U.S. Provisional Application No. 61/790,388, filed on Mar. 15, 2013, the disclosures of which are incorporated herein by reference.

FIELD OF THE INVENTION

The present invention relates generally to brushless direct current motors.

BACKGROUND OF THE INVENTION

Typical motors with round stator laminations work well in many applications. However, some motor applications require significant torque from the motor, yet also require that the motor housing be small enough so as not to interfere with operation of the device incorporating the motor. By way of non-limiting example, a cylindrical mower for cutting grass on a golf course fairway or sports field requires more torque than a cylindrical mower for cutting finer grass on a putting green to achieve a clean cut. However, use of a conventional motor having round stator laminations to rotate a cylindrical blade reel of a fairway or sports field mower about a horizontal axis presents a problem. The conventional motor, which is mounted at an axial end of the blade reel and is situated very close to the ground, has a round bottom that applies some downward pressure to the grass. This tends to lay the grass down, which is cosmetically undesirable on golf courses, sports fields, or other highly-visible areas where such "layover" is considered unattractive.

What is needed is an improved motor design capable of providing sufficient torque within a reduced spatial envelope.

SUMMARY OF THE INVENTION

The invention provides a motor useful for powering rotation of a blade reel of a cylindrical mower. The motor comprises a rotor having a plurality of pole magnets angularly spaced about the rotor's rotational axis through an angle of 360°, and a stator including a plurality of windings angularly spaced about the rotational axis through an angle less than 360° to provide an angular section free of windings, wherein at least one of the plurality of pole magnets is not radially opposite any of the plurality of windings at any given rotational position of the rotor.

The internal configuration of the motor allows the motor to have a housing characterized by a cross-sectional shape in the form of a chord-truncated circle, such that the housing has a flat bottom portion corresponding to the angular section of the stator that is free of windings. The truncated motor housing avoids unattractive "layover" of grass during mowing associated with round motor housings.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
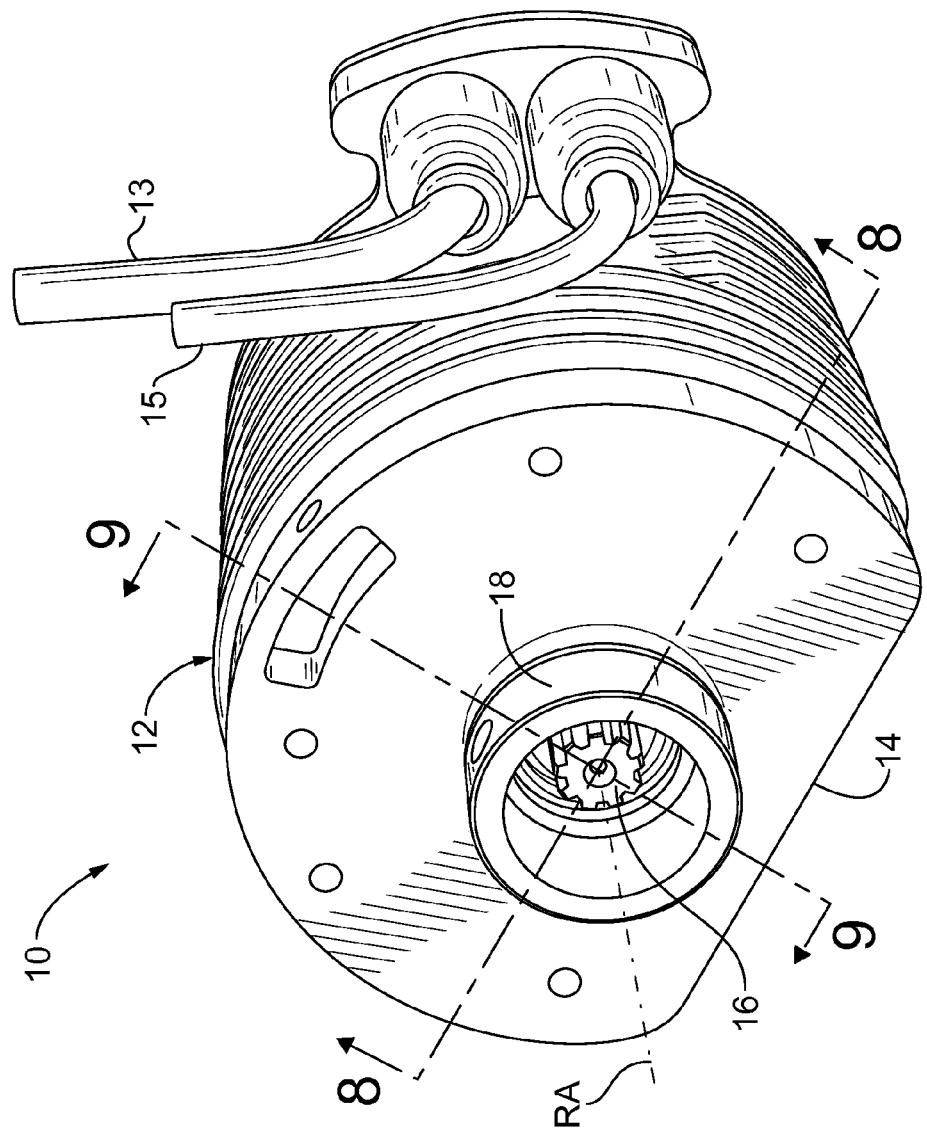
FIG. 1 is a perspective view of a motor formed in accordance with an embodiment of the present invention.
Figure 2:
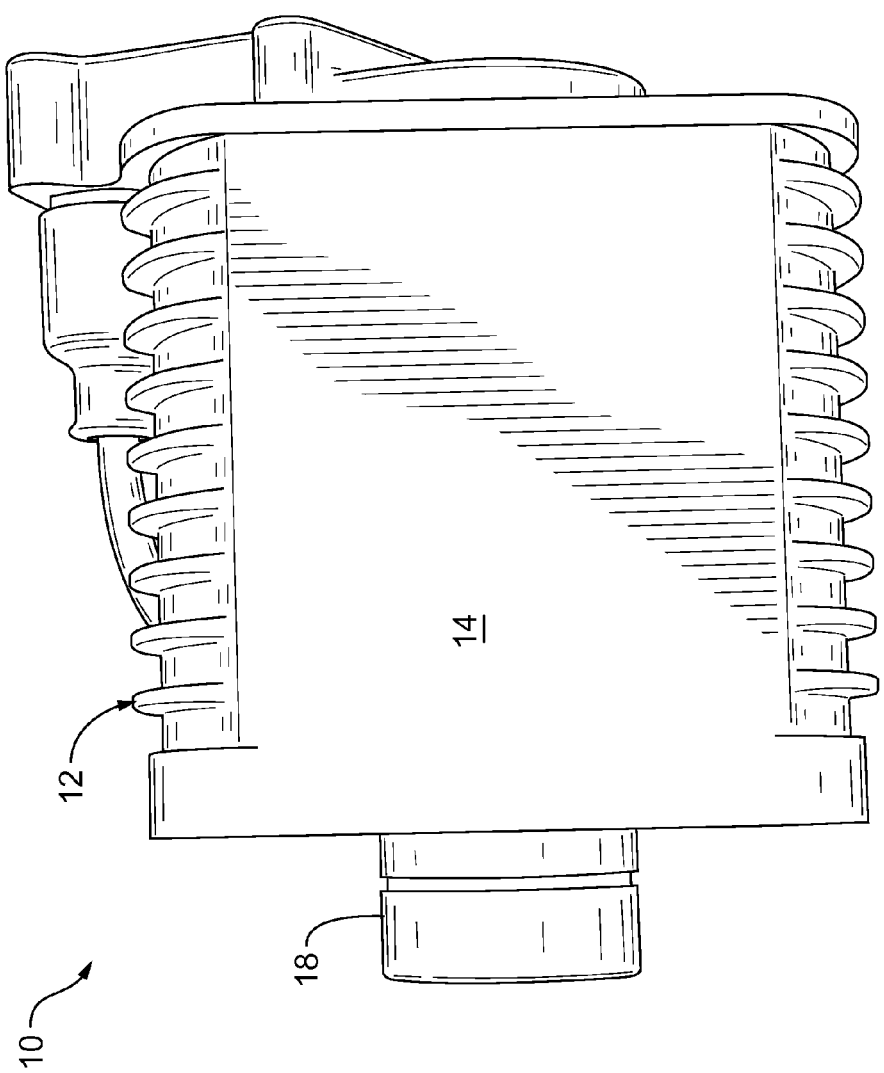
FIG. 2 is a bottom view of the motor shown in FIG. 1.
Figure 3:
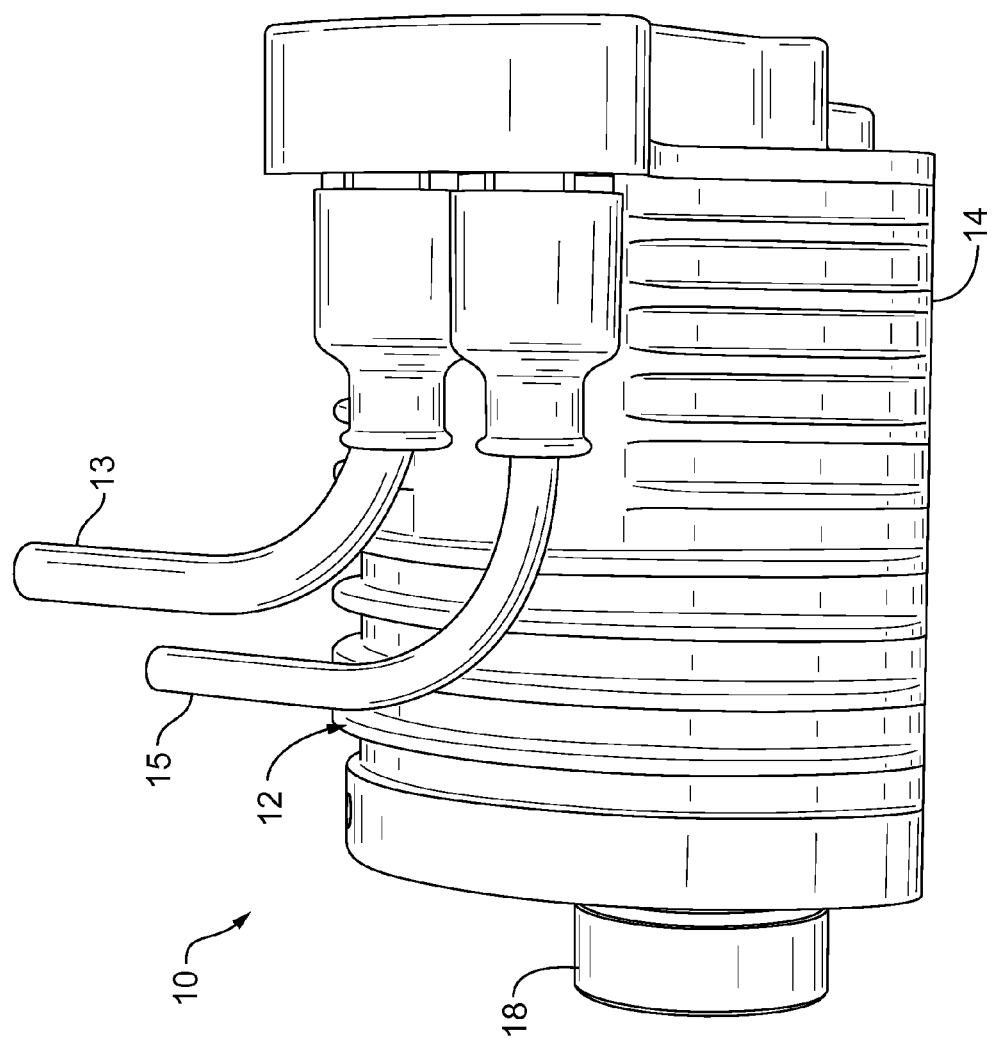
FIG. 3 is a right side view of the motor shown in FIG. 1.
Figure 4:
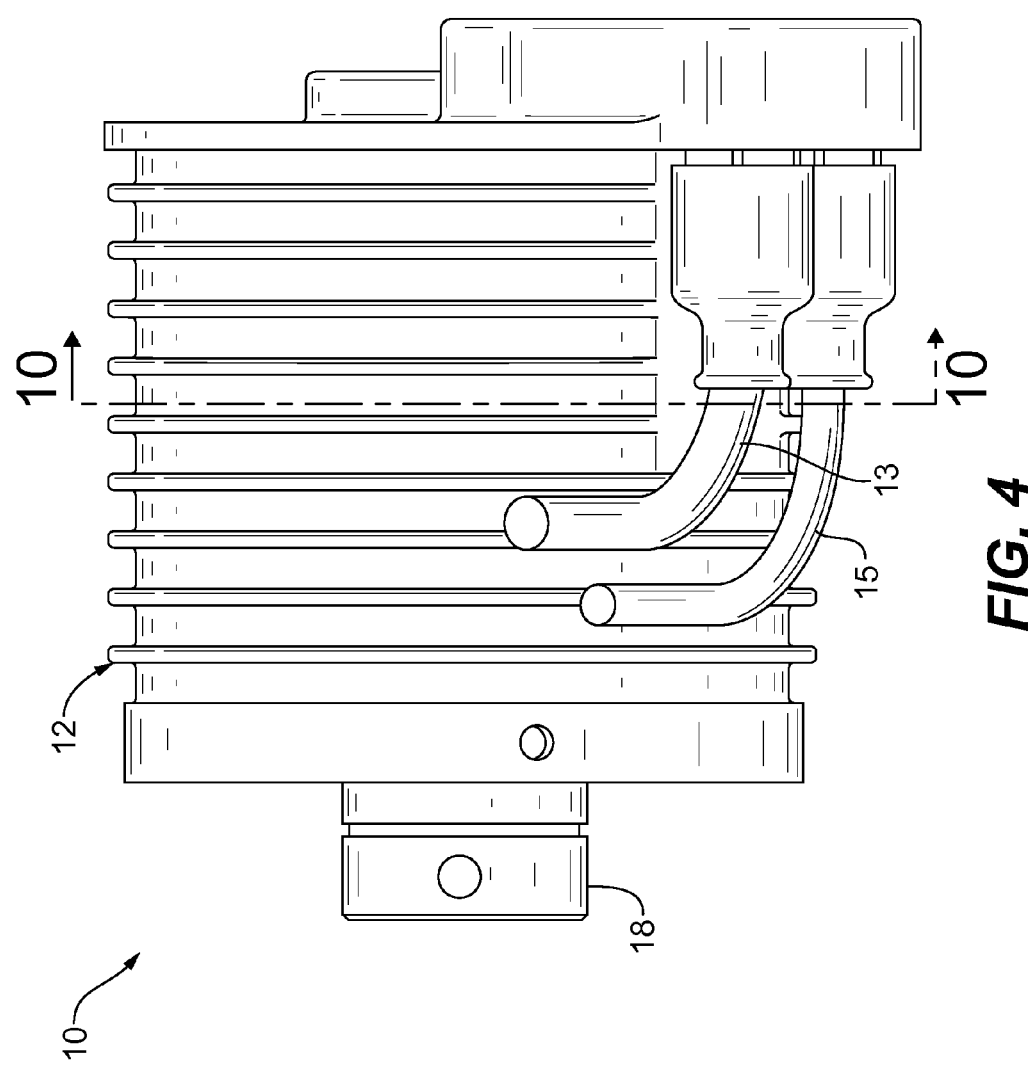
FIG. 4 is a top view of the motor shown in FIG. 1.
Figure 5:
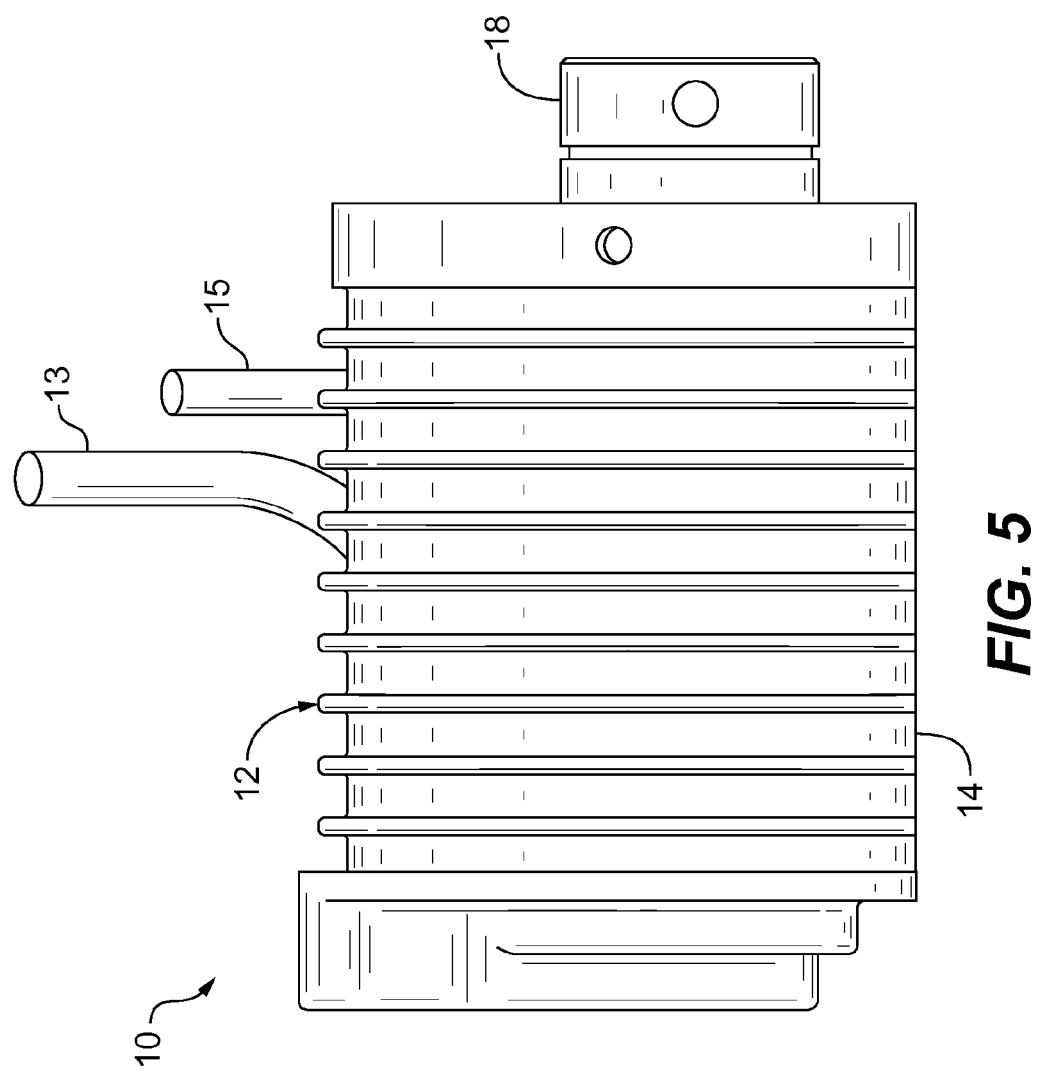
FIG. 5 is a left side view the motor shown in FIG. 1.

FIG. 1 shows a motor 10 designed to drive rotation of a blade reel of a cylindrical mower about a horizontal axis. Motor 10 has a housing 12 characterized by a flat portion 14. A drive shaft 16 is rotatable about a rotational axis RA. Drive shaft 16 may terminate in an output gear exposed through a tubular collar 18 at a front end of housing 12. Electrical leads 13 and 15 connect to motor 10 near the rear of housing 12.

Figure 6:
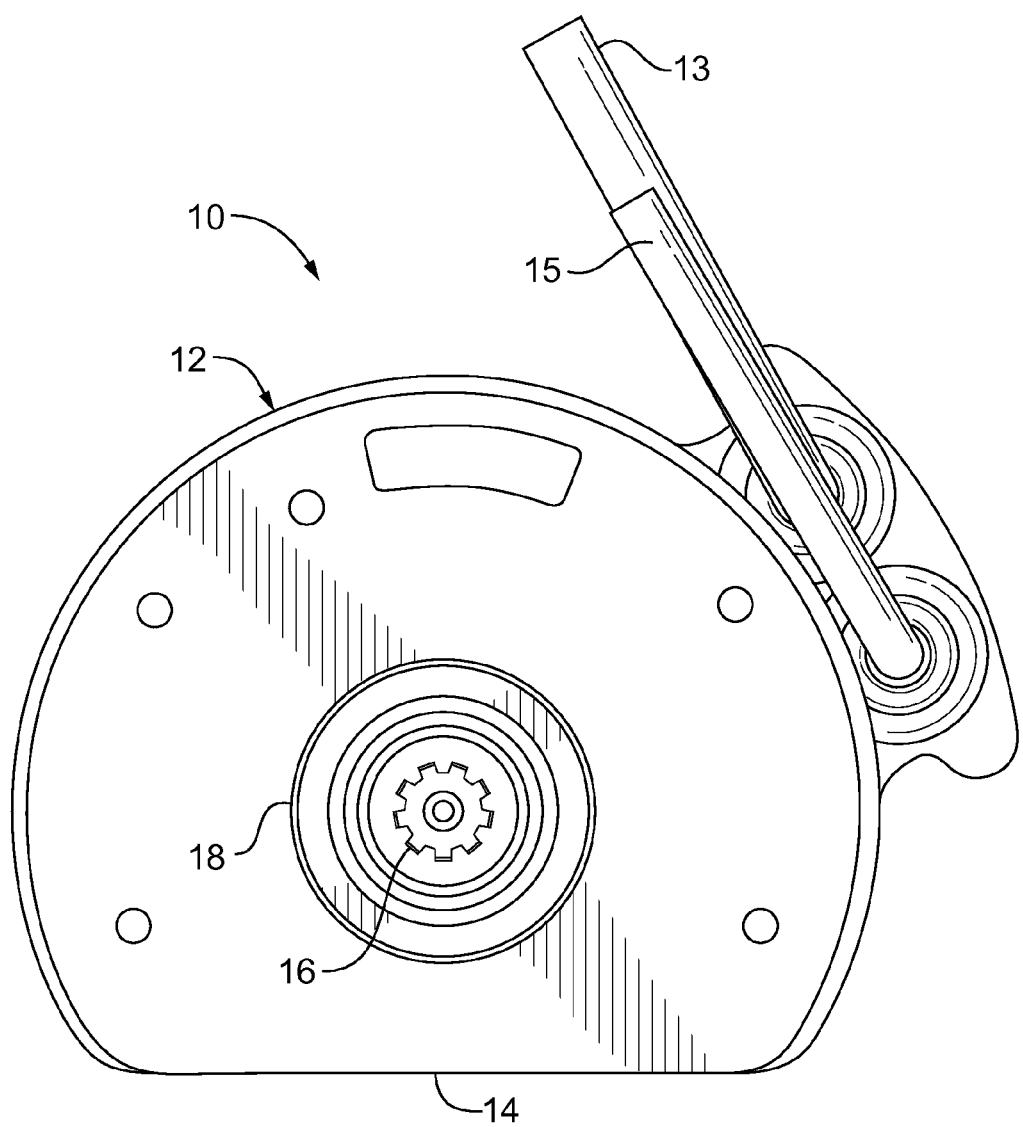
FIG. 6 is a front view of the motor shown in FIG. 1.
Figure 7:
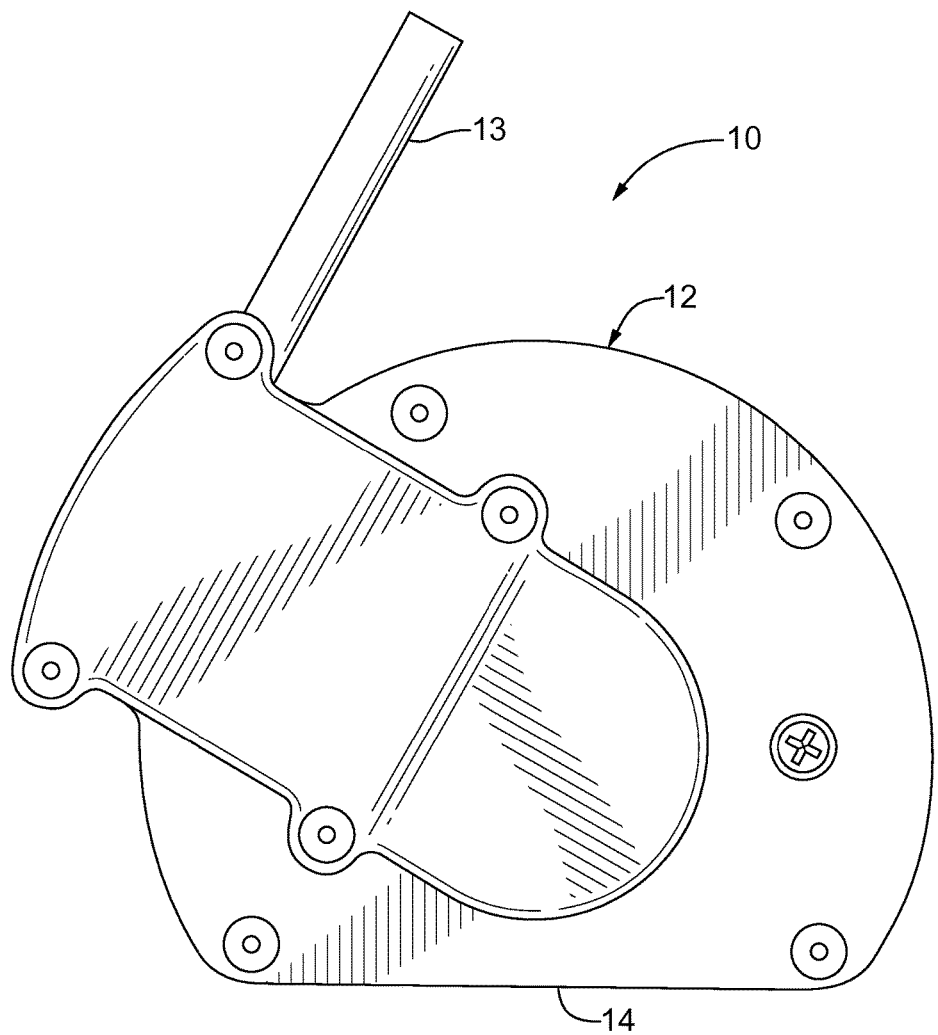
FIG. 7 is a rear view of the motor shown in FIG. 1.
Figure 8:
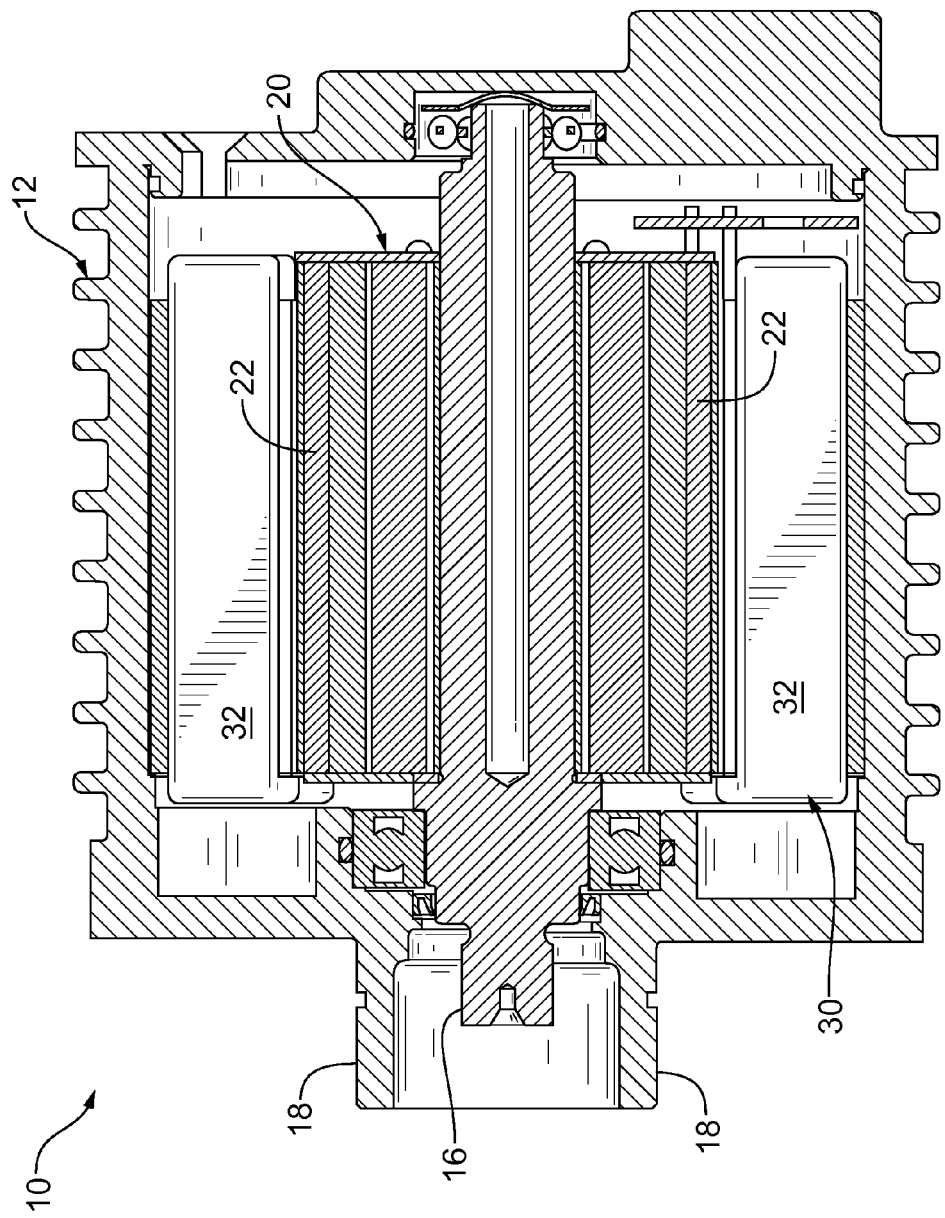
FIG. 8 is sectional view of the motor taken generally along the line 8-8 in FIG. 1.
Figure 9:
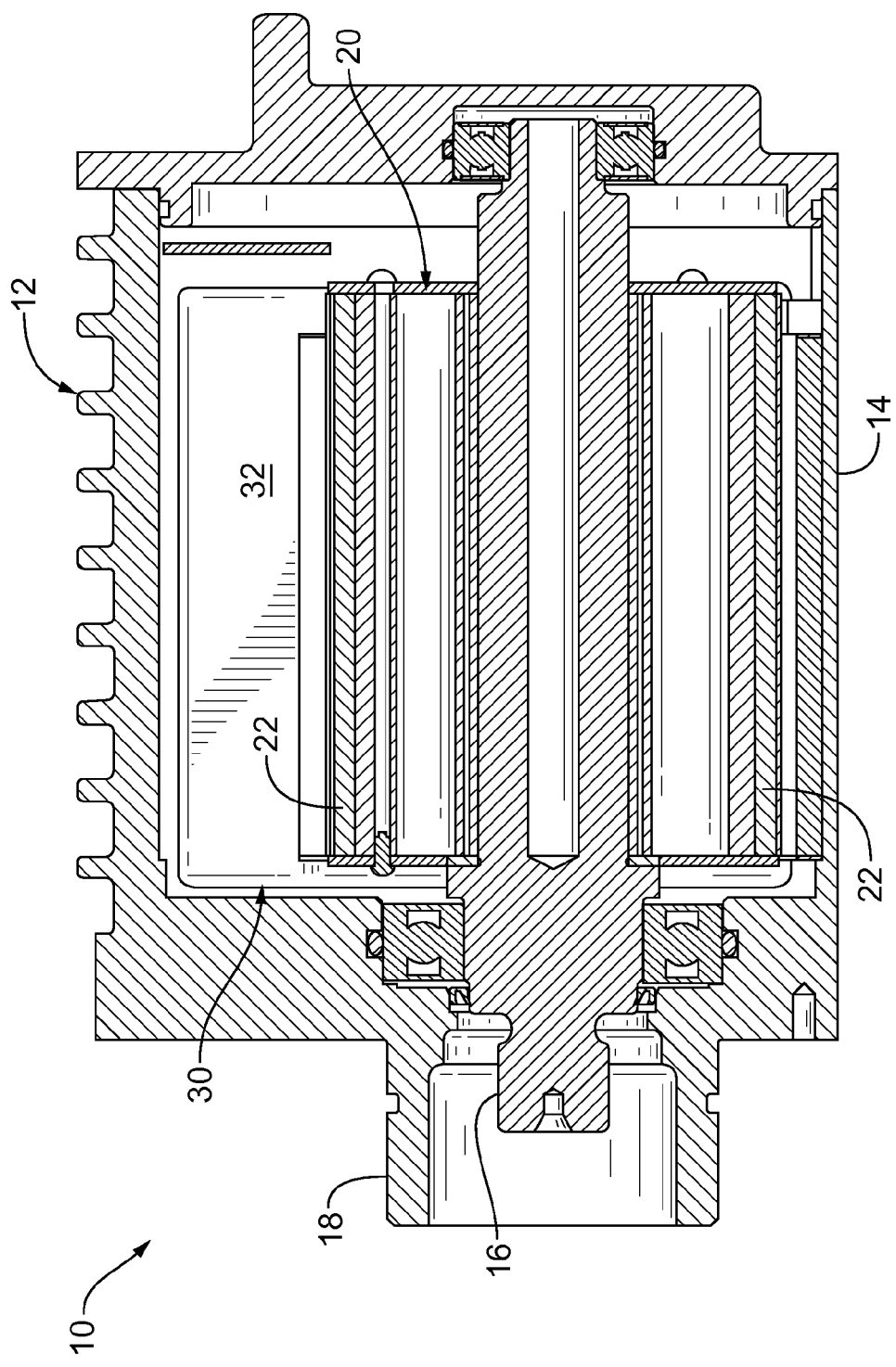
FIG. 9 is sectional view of the motor taken generally along the line 9-9 in FIG. 1.
Figure 10:
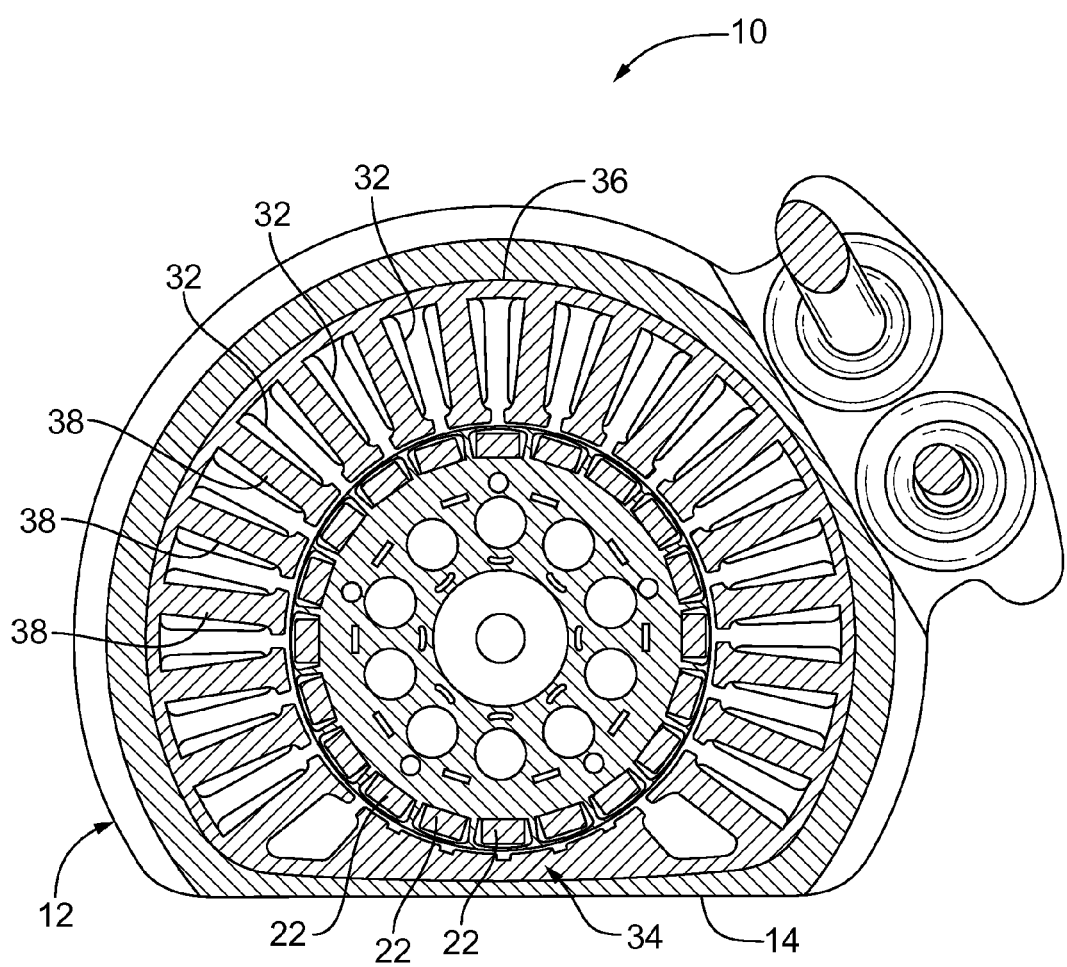
FIG. 10 is sectional view of the motor taken generally along the line 10-10 in FIG. 4.

As best seen in FIGS. 1 and 6, housing 12 is elongated along the rotational axis RA and has a cross-sectional shape in the form of a chord-truncated circle. The term "chord-truncated circle" is intended to mean the shape that results when a circle is truncated by a chord, wherein the shape has an arcuate portion and a straight portion connecting opposite ends of the arcuate portion. Motor 10 may be mounted on a cylindrical mower (not shown) such that flat portion 14 of housing 12 faces the ground. As will be appreciated, the shape of housing 12 substantially eliminates the problem of unattractive "layover."

To avoid layover, the inventors were challenged to locate flat portion 14 as close as possible to rotational axis RA without sacrificing motor torque and overall performance. In furtherance of the invention, the internal configuration of motor 10 was modified as described below to fit within the reduced spatial envelope of truncated housing 12.

Reference is made now to FIGS. 8-13. In accordance with the present invention, motor 10 comprises a rotor 20 rotatable about rotational axis RA. Rotor 20 includes a plurality of pole magnets 22 angularly spaced about rotational axis RA through an angle of 360°. Motor 10 also comprises a stator 30 including of a plurality of windings 32 angularly spaced about rotational axis RA through an angle less than 360° to provide an angular section 34 of the stator that is free of windings 32, wherein at least one of the plurality of pole magnets 22 is not radially opposite any of the plurality of windings 32 at any given rotational position of rotor 20.

In the illustrated embodiment, one-quarter of the pole magnets 22 are not radially opposite any of the plurality of windings 32 at any given rotational position of the rotor. Each winding 32 is arranged on a respective tooth 38 of a laminated stator core 36. By way of non-limiting example, teeth 38 may be angularly spaced about rotational axis RA by regular angular intervals through a total arc of 270°. For example, in the depicted embodiment, exactly eighteen teeth 38 are provided at intervals of 15°. Thus, in this example, rotor 10 may have exactly eighteen windings 32. In the illustrated embodiment, exactly twenty pole magnets 22 are provided on rotor 20, five of the twenty pole magnets 22 are not radially opposite any of the plurality of windings 32 at any given rotational position of rotor 20.

Figure 11:
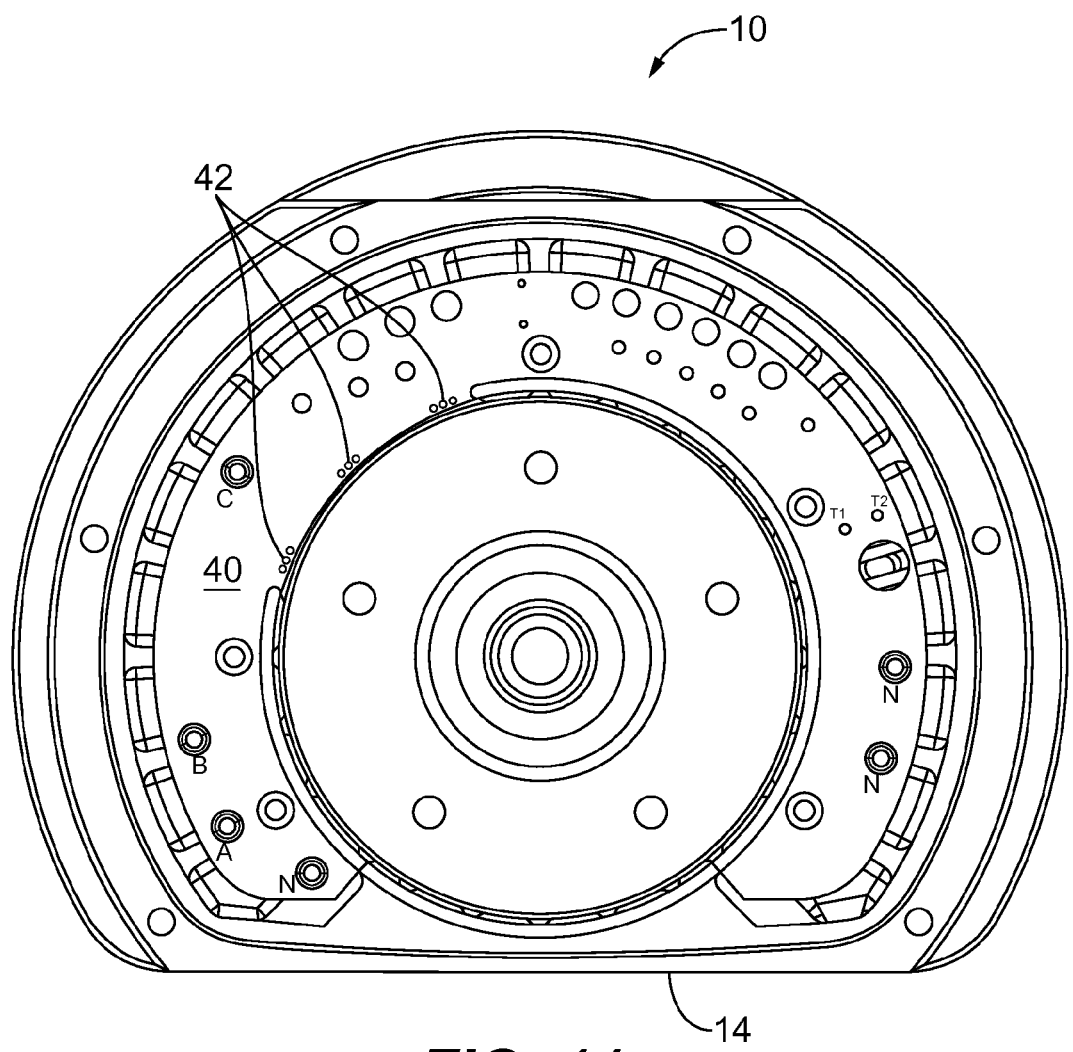
FIG. 11 is a rear view of the motor, wherein a rear cover and rotor end plate are removed to reveal internal structure.
Figure 12:
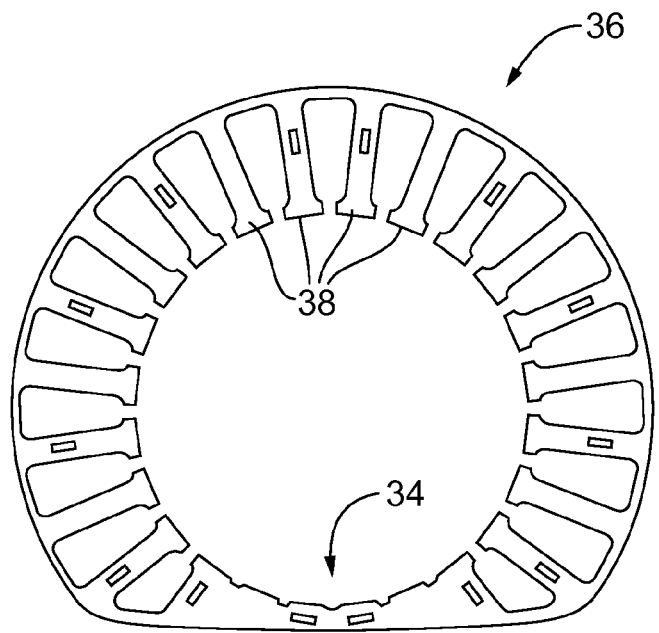
FIG. 12 is a plan view of a stator lamination of the motor shown in FIG. 1.
Figure 13:
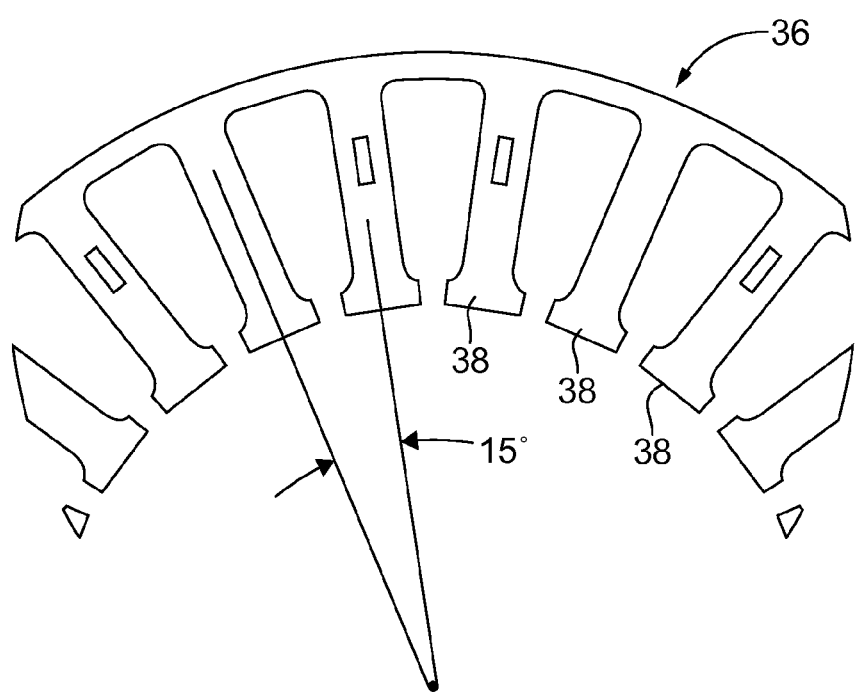
FIG. 13 is a detailed view of the stator lamination shown in FIG. 12.

Motor 10 includes an electronic circuit board 40 within housing 12. As shown in FIG. 11, circuit board 40 may be an arc-shaped circuit board arranged to follow the arc-shaped arrangement of windings 32. Motor commutation may be a hybrid scheme involving a sensor-based commutation mode using Hall effect sensors and a sensorless commutation mode using a back EMF zero-crossing detection circuit. In this regard, circuit board 40 includes junctions 42 for mounting Hall effect sensors (not visible) as well as a back EMF zero-crossing detection circuit.

The Hall effect sensors allow reliable high-torque motor starting. Software in the motor controller switches over to a sensorless mode once the motor speed exceeds a predetermined threshold rpm value, for example 400 rpm. The sensorless commutation method automatically compensates for flux shift and back EMF wobble. A phase angle advance algorithm may be added to help compensate for the high inductance. Because of the relatively high pole count, motor speed, and inductance, the sensorless commutation is pushed relatively hard because at high loads the current flyback period lasts nearly as long as the "timeout" period (the "timeout" period is the waiting time needed to allow the flyback current to stop flowing, before starting to look for the back EMF zero-crossing point). The Hall effect sensor signals provide a type of failsafe. That is, in case the back EMF crossover is missed, the Hall effect sensor signal transition is available to indicate that the motor should be commutated.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A motor comprising:
    a rotor rotatable about a rotational axis, the rotor including a plurality of pole magnets angularly spaced about the rotational axis through an angle of 360°, wherein the rotor includes exactly twenty pole magnets;
    a stator including of a plurality of windings angularly spaced about the rotational axis through an angle less than 360° to provide an angular section free of windings, wherein the stator includes a laminated core having a plurality of teeth for supporting the plurality of windings, wherein the plurality of teeth are angularly spaced about the rotational axis at regular angular intervals through an angle of approximately 270°, wherein the laminated core includes exactly eighteen teeth, and wherein the angular interval between adjacent teeth is 15°;
    a Hall effect sensor for detecting rotational position of the rotor relative to the stator; and
    a back EMF zero-crossing detection circuit;
    wherein at least one of the plurality of pole magnets is not radially opposite any of the plurality of windings at any given rotational position of the rotor; and
    wherein the motor is commutated based on a signal from the Hall effect sensor when the motor is operating at or below a predetermined threshold rpm, and wherein the motor is commutated based on a signal from the back EMF zero-crossing detection circuit when the motor is operating above the threshold rpm.

2. The motor according to claim 1, further comprising a housing, wherein the housing has a flat portion corresponding to the angular section free of windings.

3. The motor according to claim 2, wherein the motor housing is elongated along the rotational axis and has a cross-sectional shape in the form of a chord-truncated circle.

4. The motor according to claim 1, wherein one-quarter of the plurality of pole magnets are not radially opposite any of the plurality of windings at any given rotational position of the rotor.

5. The motor according to claim 1, wherein the motor is commutated based on a signal from the Hall effect sensor as a failsafe when the motor is operating above the threshold rpm and the back EMF zero-crossing detection circuit fails to detect back EMF zero-crossing.

* * * * *